(12) United States Patent
Chong et al.

(10) Patent No.: US 8,566,259 B2
(45) Date of Patent: Oct. 22, 2013

(54) METHOD AND SYSTEM FOR PARALLEL STATISTICAL INFERENCE ON HIGHLY PARALLEL PLATFORMS

(75) Inventors: Jike Chong, Sunnyvale, CA (US); Youngmin Yi, Seoul (KR); Ekaterina I. Gonina, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 481 days.

(21) Appl. No.: 12/876,898

(22) Filed: Sep. 7, 2010

(65) Prior Publication Data

US 2011/0066578 A1 Mar. 17, 2011

Related U.S. Application Data

(60) Provisional application No. 61/240,127, filed on Sep. 4, 2009.

(51) Int. Cl.
*G06N 5/00* (2006.01)
(52) U.S. Cl.
USPC .............................................. 706/12; 706/45
(58) Field of Classification Search
USPC ...................................................... 706/12, 45
See application file for complete search history.

(56) References Cited

PUBLICATIONS

Chong, et al., A Fully Data Parallel WFST-based Large Vocabulary Continuous Speech Recognition on a Graphics Processing Unit, Department of Electrical Engineering and Computer Science, University of California, Berkeley, 2009, pp. 1-4.*
Mohri, M. et al.—"Weighted Finite-State Transducers in Speech Recognition"—Computer Speech and Language, vol. 16, 2002, pp. 1-26.
Lumsdaine, A. et al.—"Challenges in Parallel Graph Processing"—Parallel Processing Letters, 2007, pp. 1-16.
Janin, A.—"Speech Recognition on Vector Architectures"—Ph.D. dissertation, University of California, Berkeley—Berkeley, CA, 2004, pp. 1-100.
NVIDIA CUDA Programming Guide, NVIDIA Corporation, 2009, version 2.2 beta, pp. 1-137 downloaded from http://www.nvidia.com/CUDA.
Ney, H. et al.—"Dynamic Programming Search for Continuous Speech Recognition"—IEEE Signal Proc., vol. 16, 1999, pp. 1-39.
Ravishankar, M.K.—"Parallel Implementation of Fast Beam Search for Speaker-Independent Continuous Speech Recognition"—Computer Science & Automation, Indian Institute of Science, Jul. 16, 1993, pp. 1-24.
Phillips, S. et al.—"Parallel Speech Recognition"—Inter. Journ. of Parallel Programming, vol. 27, No. 4, 1999, pp. 257-288.
You, K. et al.—"OpenMP-Based Parallel Implementation of a Continuous Speech Recognizer on a Multi-Core System"—Proc. IEEE Intl. Conf. on Acoustics, Speech and Signal Processing (ICASSP), Taipei, Taiwan, 2009, pp. 621-624.

(Continued)

*Primary Examiner* — Wilbert L Starks
(74) *Attorney, Agent, or Firm* — John P. O'Banion

(57) ABSTRACT

Methods for faster statistical inference in computation based recognition problems on highly parallel processors with multiple cores on-a-chip are disclosed, which include: selectively flattening levels of the recognition network to improve inference speed (improving the recognition model); selectively duplicating parts of the recognition network to minimize a critical section in atomic accesses to as few as one atomic instruction (improving the recognition procedure); and combining weight and source port into one 32-bit word to minimize the number of atomic operations. These methods have been implemented on an NVIDIA GTX 280 processor in a Large Vocabulary Continuous Speech Recognition (LVCSR) embodiment, and achieve more than a 10× speed up compared to a highly optimized sequential implementation on an Intel Core i7 processor.

17 Claims, 13 Drawing Sheets

(56) References Cited

PUBLICATIONS

Ishikawa, S. et al.—"Parallel LVCSR Algorithm for Cellphone-Oriented Multicore Processors"—Proc. IEEE Intl. Conf. on Acoustics, Speech and Signal Processing (ICASSP), Toulouse, France, 2006, pp. I-177-I-180.

Dixon, P.R. et al.—"Fast Acoustic Computations Using Graphics Processors"—Proc. IEEE Intl. Conf. on Acoustics, Speech and Signal Processing (ICASSP), Taipei, Taiwan, 2009, pp. 4321-4324.

Cardinal, P. et al.—"GPU Accelerated Acoustic Likelihood Computations"—Proc. Interspeech, 2008, pp. 1-4.

Chong, J. et al.—"Data-Parallel Large Vocabulary Continuous Speech Recognition on Graphics Processors"—Proc. Workshop on Emerging Applications and Manycore Architectures, 2008, pp. 1-13.

Kanthak, S. et al.—"A Comparison of Two LVR Search Optimization Techniques"—Proc. Intl. Conf. on Spoken Language Processing (ICSLP), Denver Colorado, 2002, pp. 1309-1312.

Chong, J. et al.—"Scalable HMM based Inference Engine in Large Vocabulary Continuous Speech Recognition"—Workshop on Multimedia Signal Processing and Novel Parallel Computing, Jul. 2009, pp. 1-4.

Tur, G. et al.—"The CALP Meeting Speech Recognition and Understanding System"—Proc. IEEE Spoken Language Technology Workshop, 2008, pp. 1-4.

Stolcke, A. et al.—"The SRI-ICSI Spring 2007 Meeting and Lecture Recognition System"—Lecture Notes in Computer Science, vol. 4625, No. 2, 2008, pp. 450-463.

* cited by examiner

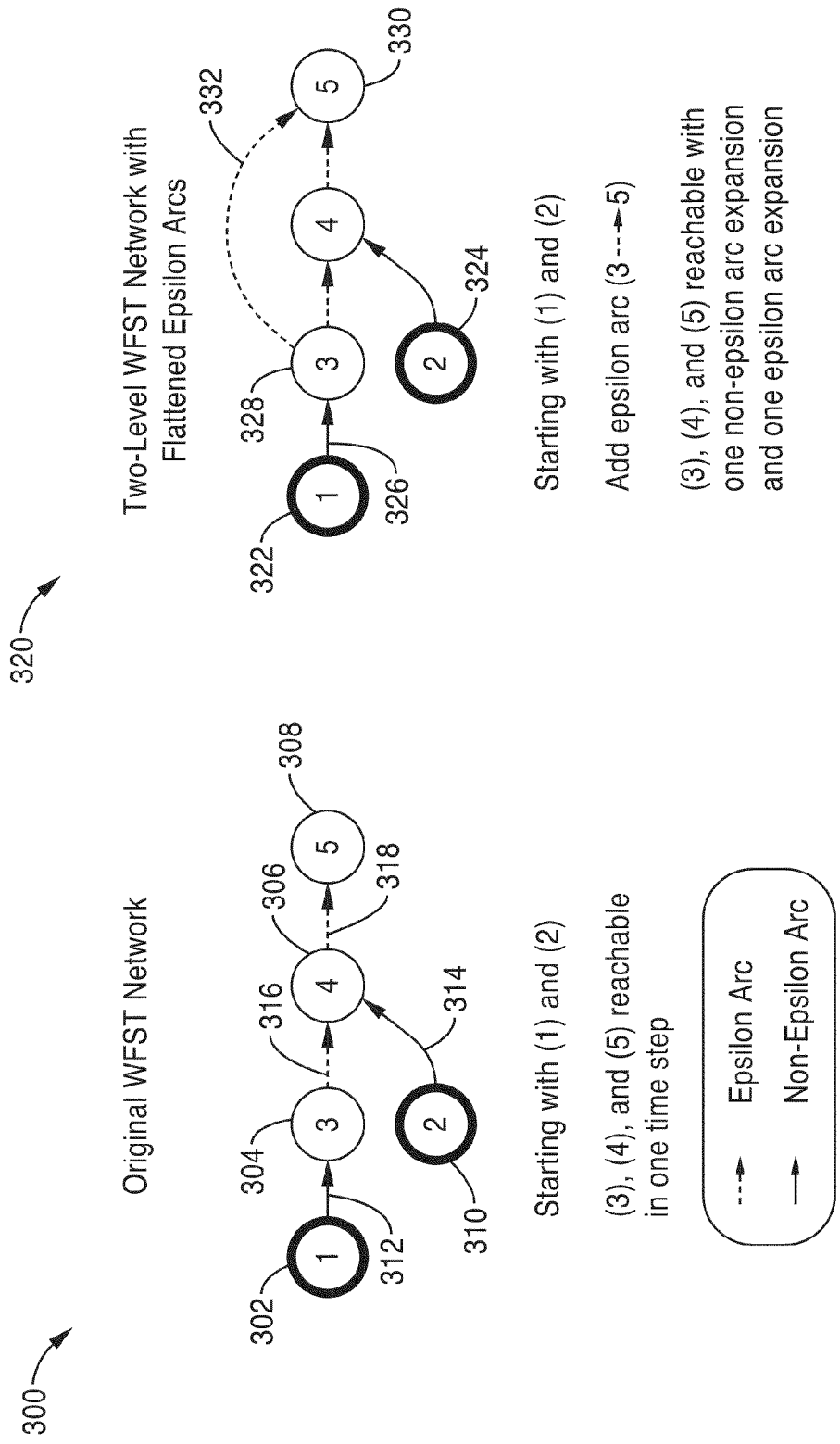

A Section of a Weighed Finite State Transducer Network

METHOD AND SYSTEM FOR PARALLEL STATISTICAL INFERENCE ON HIGHLY PARALLEL PLATFORMS

CROSS-REFERENCE TO RELATED APPLICATIONS

This application claims priority to U.S. provisional patent application Ser. No. 61/240,127 filed on Sep. 4, 2009, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in a text file entitled "B09_119_2_source_code_listing.txt" created on Sep. 7, 2010 and having a 105 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

A portion of the material in this patent document is also subject to protection under the mask work registration laws of the United States and of other countries. The owner of the mask work rights has no objection to the facsimile reproduction by anyone of the patent document or the patent disclosure, as it appears in the United States Patent and Trademark Office publicly available file or records, but otherwise reserves all mask work rights whatsoever. The mask work owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to statistical analysis, more particularly to parallel processing of statistical analysis, and more particularly to parallel processing of Large Vocabulary Continuous Speech Recognition (LVCSR).

2. Description of Related Art

Graphical Processing Units (GPUs) are typically used for massively parallel computations, but have limitations when used with inference engines relating to complex communication requirements.

BRIEF SUMMARY OF THE INVENTION

An aspect of the invention is a method of statistical inference, comprising: providing a computing platform comprising a Central Processing Unit (CPU) and a Graphical Processing Unit (GPU); generating a one or more level arc-based recognition network for a problem, comprising: a plurality of epsilon arcs; a plurality of non-epsilon arcs; a plurality of states that may be interconnected by one or more epsilon or non-epsilon arcs; and selectively flattening the levels of the recognition network so as to improve inference speed; wherein the recognition network is executed on the CPU and the GPU.

In the method above, the selectively flattening step may result in a flatter recognition network selected from a group of flatter networks consisting of: a two-level network and a one-level network.

In the method above, the selectively flattening step may comprise: addition of one or more epsilon arcs to guarantee states that can be reached through epsilon arcs will be reached in one level of traversal, or replacing one or more epsilon arcs with non-epsilon arcs to eliminate the presence of epsilon arcs in the recognition network; wherein the recognition network semantics are preserved. Alternatively, the selectively flattening step may comprise: replacing one or more epsilon arcs with non-epsilon arcs; wherein the recognition network semantics are preserved.

The method above may further comprise generating an incoming array for a target state in the recognition network; wherein the incoming array comprises: a set of incoming states pointing to the target state; and a corresponding weight that each incoming state will traverse to the target state.

The method above may still further comprise selectively pruning the incoming array to remove states with the corresponding probability below a threshold, thereby resulting in a reduced incoming state array.

The method above may additionally comprise mapping the reduced incoming state array to a port array.

The method above may comprise selectively duplicating parts of the recognition network so as to reduce the maximum allowable size of the port array to a size represented by a limited number of bits in the Least Significant Bits (LSBs) portion of a merged word associated with each of the reduced incoming state array elements. Alternatively, the method above may comprise selectively duplicating parts of the recognition network so as to reduce the maximum allowable size of the port array to a size represented by a limited number of bits in a Least Significant Bits (LSBs) portion of a merged word associated with each of the reduced incoming state array elements.

The method above may improve speed of execution by steps comprising: assigning a weight to a Most Significant Bits (MSBs) portion of the merged word associated with each of the reduced incoming array state elements; wherein the weight represents the corresponding probability that the reduced incoming array state element will traverse to the target state. The assigned weight may be in a fixed point representation.

During the process of traversing the recognition network in one- or two-levels of parallel traversal, the traversal from the reduced incoming state array to the target state may be conflict-free.

The conflict-free traversal may use an extremum of the merged word weight associated with the reduced incoming array state elements. The extremum may be selected from a group of extrema consisting of a maximum and a minimum. The conflict-free traversal extremum may be performed on the GPU. Further, the traversal extremum step may be performed using one- or two-levels of atomic extremum functions on the GPU.

Additionally, the generating of the incoming array corresponding weights may be performed on the GPU.

The problem that may be (without limitation) solved in the above methods may be selected from a group of problems consisting of: Large Vocabulary Continuous Speech Recognition (LVCSR); Optical Character Recognition (OCR); and automatic language translation.

A CPU and GPU executable may be stored on a computer readable medium, capable of executing the methods described above.

The CPU and GPU described above may communicate either directly, or by means of a shared memory, or by both directly and by means of a shared memory. The CPU and GPU may have either a same or different hardware architecture, and are thereby not limited to being discrete or separable. Therefore, future GPUs having separately tasked processing units may in part act as both a CPU and a GPU, or a highly parallel CPU, or function as a traditional GPU.

In another aspect of the invention, a method for parallel statistical inference on a highly parallel platform is disclosed, comprising: combining optimizations in a recognition model (a recognition network) with optimizations in a recognition procedure (an inference engine).

In still another aspect of the invention, a statistical inference system is disclosed, comprising: a programmable CPU controlling a GPU; wherein a programming executable on the CPU causes the GPU to carry out operations comprising: selectively flattening levels of a recognition network to improve inference speed; and selectively duplicating parts of the recognition network to minimize a critical section in atomic accesses to as few as one atomic instruction.

In another aspect of the invention, a statistical inference method is disclosed, comprising: selectively flattening levels of a recognition network to improve inference speed; and selectively duplicating parts of the recognition network to minimize the critical section in atomic accesses to as few as one atomic instruction; wherein the selective flattening and selective duplication can be performed on a CPU or GPU; providing a programmable CPU controlling a programmable GPU; wherein a programming executable on the CPU causes the programmable GPU to carry out operations using the selectively flattened network; or the selectively duplicated network; or selectively flattened network and the selectively duplicated network.

In the statistical inference method above, the executing of the recognition network may be accomplished by using a merged word to minimize atomic operations in the GPU.

This disclosure describes a set of methods for faster statistical inference in computation-based recognition problems on highly parallel processors with multiple cores on-a-chip. This method combines optimizations in the recognition model (the recognition network) with optimizations in the recognition procedure (the inference engine). The methods can be summarized as follows:

1. Selectively flattening levels of the recognition network to improve inference speed; and
2. Selectively duplicating parts of the recognition network to minimize the critical section in atomic accesses to only one atomic instruction.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only:

FIG. 3A is a flow chart of the original Weighted Finite State Transducer (WFST) recognition network (the Original WFST Network).

FIG. 3B is a flow chart of the two-level WFST recognition network with selected network flattening that flattens the epsilon arcs network in the Original WFST Network of FIG. 3A where all states to be reached are reachable by an epsilon arc and a non-epsilon arc expansion (the Two-Level WFST Network with Flattened Epsilon Arcs).

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts, and that the method may vary as to the specific steps and sequence, without departing from the basic concepts as disclosed herein.

1. Introduction

Graphics processing units (GPUs) enable tremendous compute capabilities in personal desktop and laptop systems. Recent advances in the programming model for GPUs such as the Compute Unified Device Architecture (CUDA) from NVIDIA have provided an implementation path for many exciting applications beyond graphics processing such as speech recognition. In order to take advantage of high throughput capabilities of the GPU-based platforms, programmers need to transform their algorithms to fit the data parallel model. This can be challenging for algorithms that don't directly map onto the data parallel model, such as graph traversal in a speech inference engine.

In one embodiment, the use of GPUs for Large Vocabulary Continuous Speech Recognition (LVCSR) on an NVIDIA GTX280 Graphics Processing Unit (GPU) is disclosed. LVCSR is a highly complex task of pattern recognition that requires significant computation capability. Alternate embodiments of the methods shown here, but not discussed, would include optical character recognition and automatic language translation.

Figure 1:
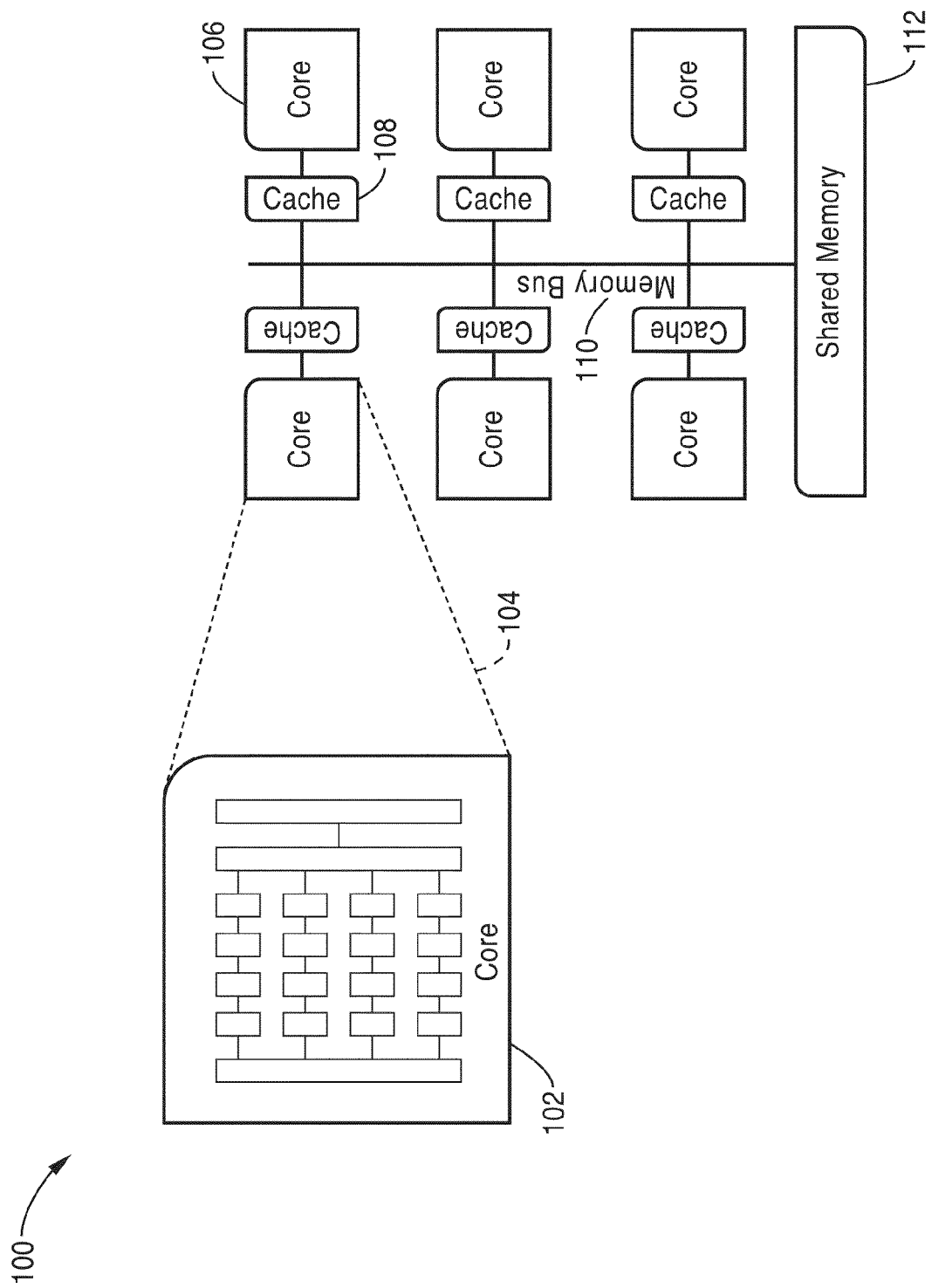
FIG. 1 is a block diagram of highly parallel processors with multiple cores and shared memory.

Refer now to FIG. 1, which is an architectural diagram of a highly parallel multi-core processor 100. Such processors have a common fundamental architecture. One of two or more independent multiple cores 102 may be collocated 104 on either on a die or substrate so as to communicate with another core 106. Each core 106 may have a local cache memory 108, and may communicate with each other through a shared memory bus 110 in a shared memory hierarchy. With the advent of the highly parallel multi-core processor 100, an opportunity for new methods exists to take advantage of the fine grained and fast communication capabilities, and provide the most efficient synchronization strategy between concurrently running tasks to satisfy the application functional requirements.

The process of recognition is a process of analyzing noisy real-world measurements, then using statistical models in a knowledge base to infer the meaning of the real-world inputs. Among several potential types of recognition, the embodiment of speech recognition is described here as a single embodiment, without limitation to other types of recognition.

Refer now to FIG. 2, which depicts a top level architecture 200 block diagram of a LVCSR application. Here, an input waveform 202 (e.g. voice) is provided to the recognition system as input. A speech feature extractor 204 extracts features from small time intervals of the input waveform 202 to help distinguish phones (units of speech). The output 206 of the speech feature extractor 204 then is used as input to a statistical inference engine 208. The output 206 of the sequence of features extracted from the input waveform 202 is fitted to a recognition network 210, which is a model of a language to be recognized.

The statistical inference engine 208 iteratively examines the sequence of input signals, taking into account one observation at a time. During each iteration the statistical inference engine 208 performs a breadth-first search starting from a set of active states.

There are two types of arcs in a WFST-based speech model connecting the active states: arcs with an input label (non-epsilon arcs), and arcs without input labels (epsilon arcs). The non-epsilon arcs consume one input symbol to perform a state transition while epsilon arcs are traversed without consuming any input symbols. In order to compute the set of next states in a given time step, one level of the non-epsilon and all the levels of epsilon arcs must be traversed from the current set of active states. Each iteration involves one breadth-first expansion on all non-epsilon arcs and multiple rounds of expansions on all epsilon arcs.

Using the statistical inference engine 208, the sequence of features extracted from the input waveform is fitted to a recognition network 210, which is a model of a language to be recognized. The recognition network 210 typically uses an acoustic model 212, a pronunciation model 214, and a language model 216 for the language to be understood. The result of the inference process is a word sequence that is inferred by taking the most likely hypothesis of the noisy inputs. This result of the statistical inference engine 208 is an output word sequence 218.

The recognition process uses a Weighted Finite State Transducer (WFST) based recognition network 210, which is a language database that is compiled offline from a variety of knowledge sources using powerful statistical learning techniques. The speech feature extractor 204 collects speech feature 206 vector outputs from audio input waveforms 202, and then the Hidden-Markov-Model-based statistical inference engine 208 computes the most likely word sequence based on the extracted speech features and the recognition network 210. In the LVCSR system the common speech feature extractors 206 can be parallelized using standard signal processing techniques. This invention discusses the application-level trade-offs that need to be made in order to efficiently parallelize the graph traversal process in LVCSR and illustrates the performance gains obtained from effective parallelization of this portion of the algorithm.

The recognition network 210 is a Finite State Machine (FSM) that may be represented with a topological graph of states and arcs. In the inference process, each state represents a possible interpretation of the input waveform. There can be multiple sequences ending in the same state, therefore it is important to keep track of all the interpretations and handle contention at those states.

The inference network can be very large. In speech recognition, there can be as many as 4 million states and 10 million arcs in a network. Computing the likelihood for all states is computationally impractical. Instead, only a subset of the most likely states is maintained, which is called the active states set. The inference process is then to compute the next set of active states by computing transition probabilities from the current active states.

Figure 2A:
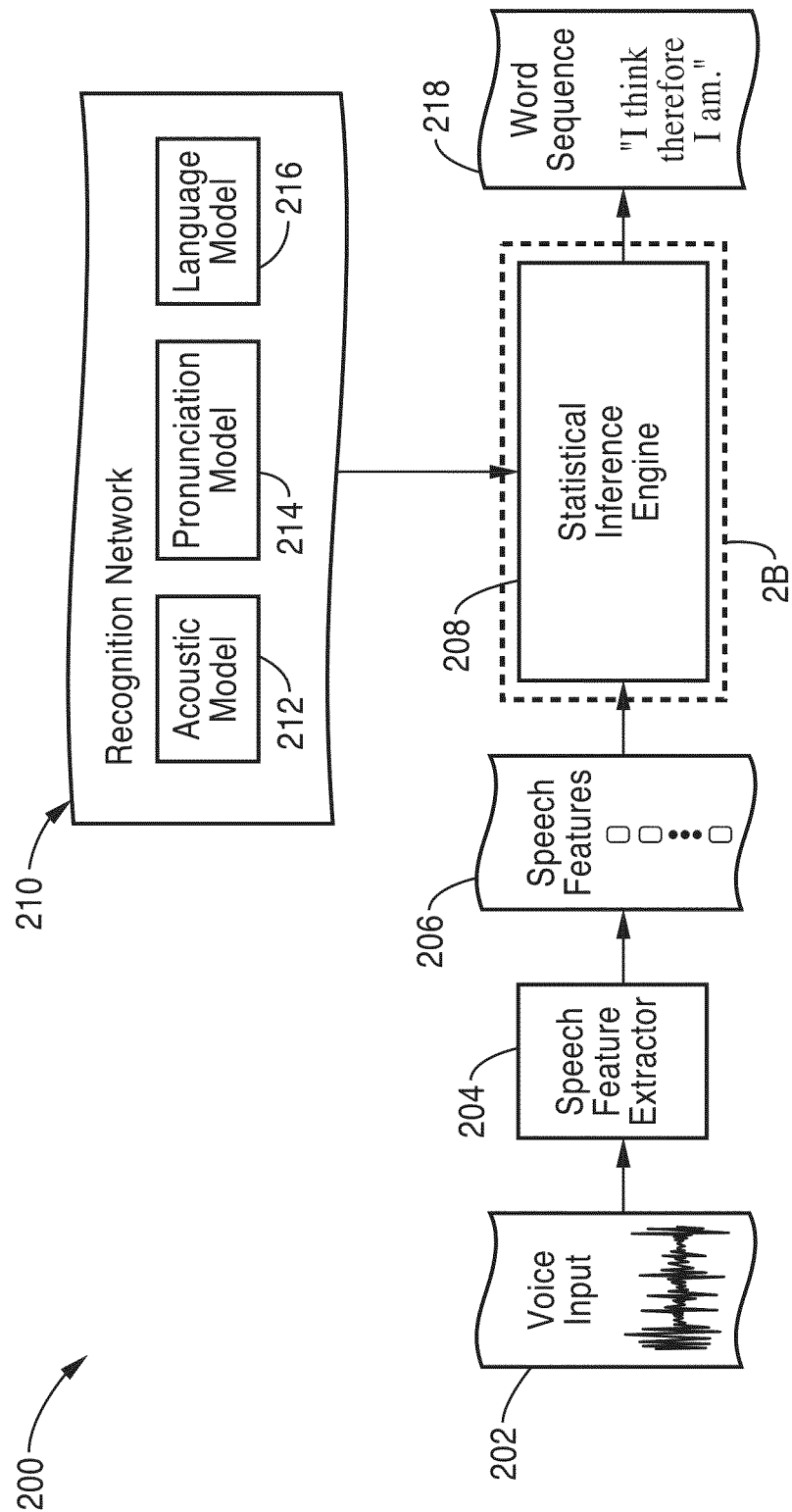
FIG. 2A is a block diagram of a Large Vocabulary Continuous Speech Recognition (LVCSR) process.
Figure 2B:
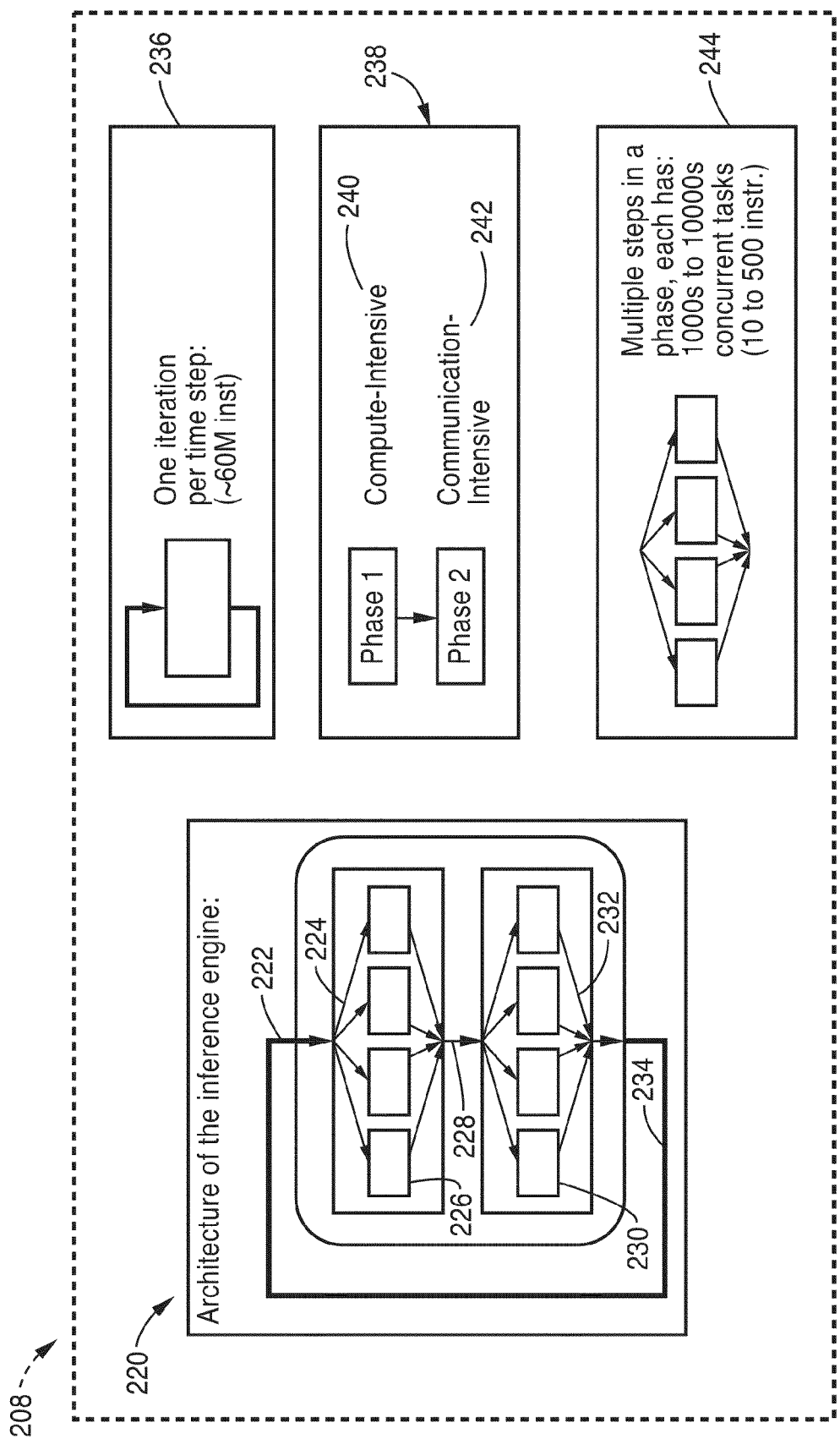
FIG. 2B is a block diagram that further describes the architecture of the statistical inference engine.

Refer now to FIG. 2B, which is a block diagram that further describes the architecture of the statistical inference engine 208 in a parallel implementation. The overall architecture 220 of the inference engine 208 begins with input software and data 222, which are distributed 224 among several first computing units 226. These several first computing units 226 generate outputs 228 that may again be distributed to still other several second computing units 230, although they are not bound to be the same. Each outputs 232 of the second several computing units 230 may be collected into an output stream 234. The output stream 234 may in turn feed back to the input software and data 222 of the inference engine 220.

In the inference engine 220, there is one iteration per time step 236, comprising about sixty million instructions.

The inference engine 220 uses two phases 238. Phase 1 240 is compute-intensive, while Phase 2 242 is communication intensive. The parallel architecture 244 used in the inference engine 220 may use multiple steps in each phase, comprising from 1000s to 10000s of concurrent tasks. Each concurrent task may have between 10 and 500 instructions.

Figure 3C:
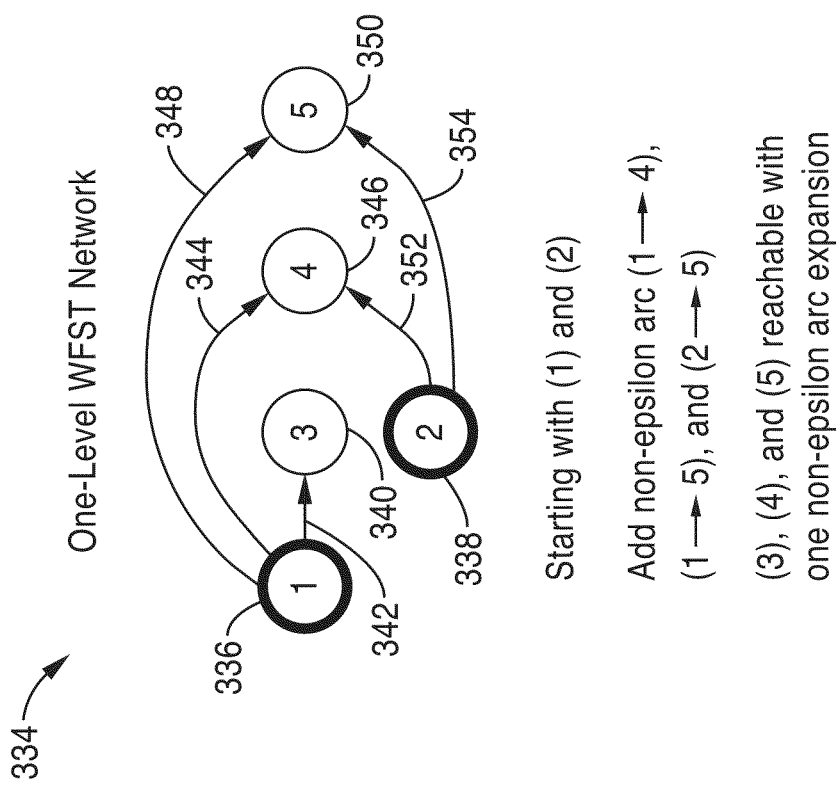
FIG. 3C is a flow chart of the one level WFST recognition network with selected network flattening that eliminates the epsilon arc network in the Original WFST Network of FIG. 3A where all states to be reached are reachable by a single non-epsilon arc expansion (the One Level WFST Network).

Refer now to FIGS. 3A-3C, which illustrate how a parallel inference engine traverses a graph-based knowledge network comprising millions of states and arcs, with FIG. 3A illustrating the Original WFST Network, FIG. 3B illustrating the Two-Level WFST Network with Flattened Epsilon Arcs and FIG. 3C illustrating the One-Level WFST Network. This is representative of a small section of a WFST-based recognition network.

First looking at FIG. 3A, the Viterbi search algorithm iterates 300 through a sequence of input audio features one time step at a time. A starting state (1) 302 could progress to state (3) 304, then state (4) 306, then state (5) 308. A second active state (2) 310 may also progress to state (4) 306. The sequence of steps from state (1) 302 to state (2) 304 takes place on a "non-epsilon arc" 312. Similarly, the sequence of steps from state (2) 310 to state (4) 306 takes place on a "non-epsilon arc" 314. However, the sequence from state (3) 304 to state (4) 306 traverses an "epsilon arc" 316, as does the sequence from state (4) 306 to state (5) 308 on "epsilon arc" 318.

Each time step starts with a set of currently active states, e.g. states (1) 302 and (2) 310 in FIG. 3A, representing the alternative interpretations of the input utterances. It proceeds to evaluate all out-going non-epsilon arcs to reach a set of destination states, e.g. states (3) 304 and (4) 306. The traversal then extends through epsilon arcs to reach more states, e.g. state (4) 306 through epsilon arc 316 and state (5) 308 through epsilon arc 318 for the next time step.

The traversal from state (1) 302 and (2) 310 to (3) 304, (4) 306 and (5) 308 can be seen as a process of active state wave-front expansion in a time step. The challenge for data parallel operations is that the expansion from (1) 302 to (3) 304 to (4) 306 to (5) 308 require multiple levels of traversal: one non-epsilon level and two epsilon levels. A data parallel traversal limits the expansion to one level at a time. Performing each level of expansion incurs significant execution overhead. There exists a significant motivation to reduce the number of levels of execution necessary in the process of the active state wave-front expansion.

FIG. 3B illustrates the necessary recognition network augmentations 320 for the Two-Level setup. Here, state (1) 322 and state (2) 324 are assumed to be active. Starting at state (1) 322 traverses over a non-epsilon arc 326 to state (3) 328. State (5) 330 is reached from state (3) 328 by an augmented flattened epsilon arc 332. In this setup each step of expansion incurs some overhead, so to reduce the fixed cost of expansion a fewer number of levels in the traversal is desired. However, depending on recognition network topology, augmenting the recognition network may cause significant increase in the number of arcs in the recognition network, thus increasing the variable cost of the traversal. This trade-off is demonstrated with a case study in the Results section.

Finally, in FIG. 3C, a One-Level WFST Network traversal 334 is shown. Here, state (1) 336 and state (2) 338 are the starting states. State (1) 336 traverses to state (3) 340 through the previously existing non-epsilon arc 342. New non-epsilon arc 344 allows state (1) 336 to directly reach state (4) 346. Additionally, new non-epsilon arc 348 allows state (1) 336 to directly reach state (5) 350.

State (2) 338 traverses to state (4) 346 through the previously existing non-epsilon arc 352. New non-epsilon arc 354 allows state (2) 338 to directly reach state (5) 350.

In a real-world recognition network used in a speech recognition application for example, the flattening process depicted from the Original WFST Network of FIG. 3A to the One-Level WFST Network of FIG. 3C introduces 1.7% more arcs into the recognition network and achieves a 19% reduction in the total execution time.

The Viterbi search algorithm keeps track of each alternative interpretation of an input utterance as a sequence of states ending in an active state at the current time step. It evaluates out-going arcs based on the current-time-step observation to arrive at the next set of active states. Each iterative time step consists of three phases: Phase 0 is a performance optimization phase that organizes the data working set into a format that is more efficient for the following phases to use. The data working set is the set of data elements used in the execution of the algorithm at runtime. Phase 1 is compute-intensive while Phase 2 is communication-intensive.

Figure 4A:
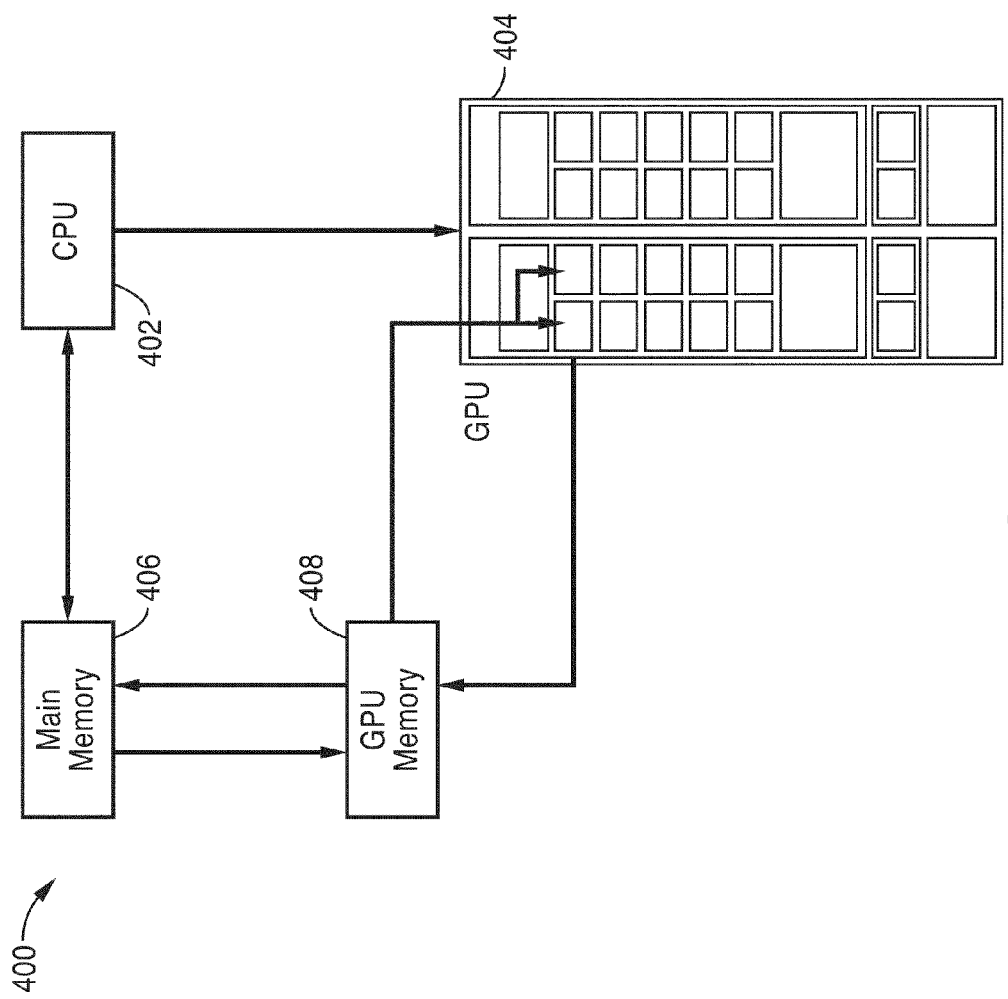
FIG. 4A is a high level block diagram of a typical CPU/GPU computing system with separately addressable main memory and GPU memory.

Refer now to FIG. 4A, which is an architectural block diagram of the CUDA/CPU/memory layout 400. The inference engine is implemented using the CUDA device from NVIDIA, which requires that the computation to be organized into a sequential host program on a central processing unit (CPU) 402 calling parallel kernels running on the graphical processing unit (GPU) 404. A kernel executes the same scalar sequential program across a set of parallel threads where each thread operates on a different piece of data. The CPU 402 and the GPU 404 have separate memory spaces (respectively 406 and 408) and there is an implicit global barrier between the different kernels.

Figure 4B:
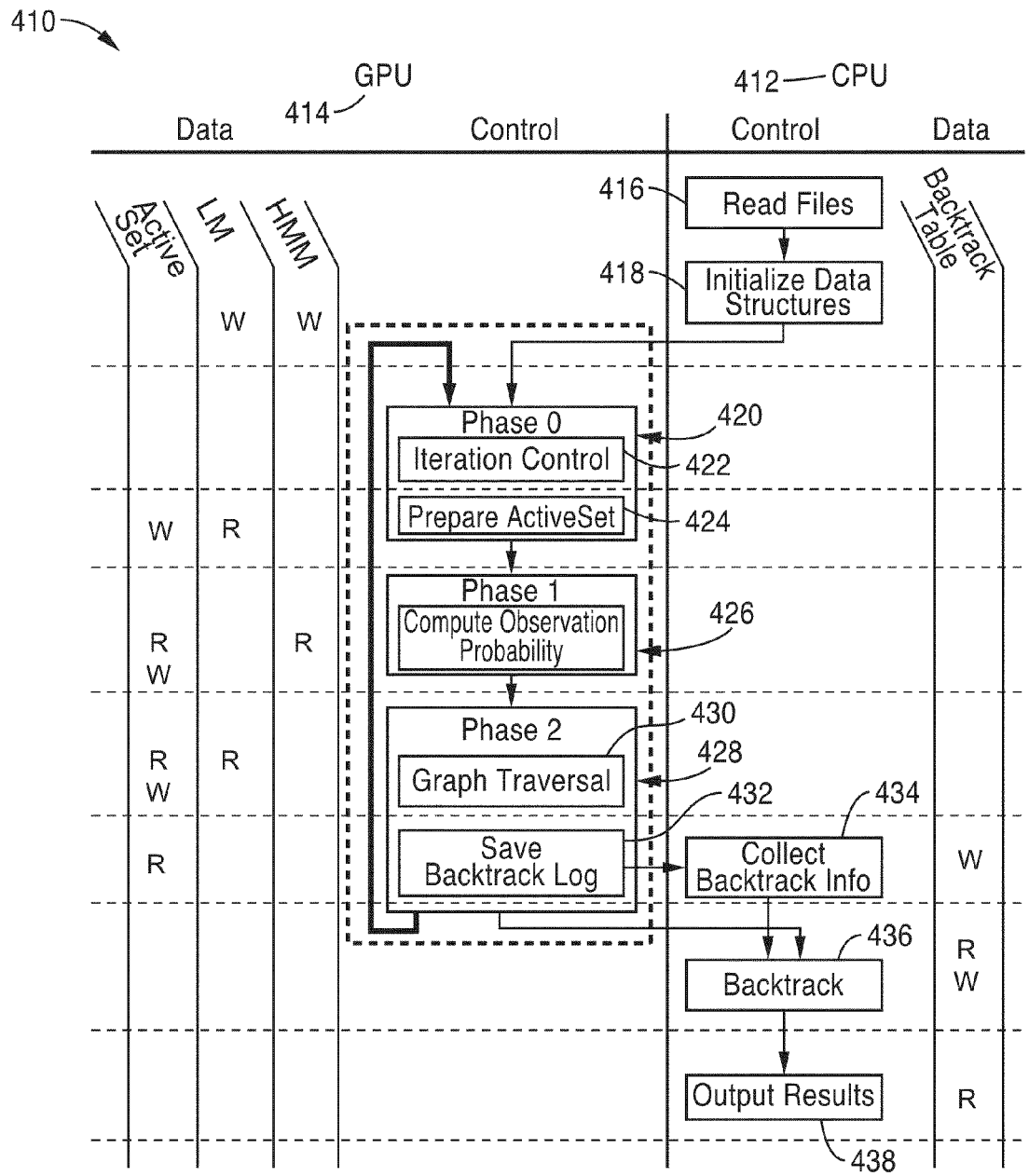
FIG. 4B is a flow chart of a typical CPU/GPU computing system where computation-intensive and/or communication-intensive (e.g. statistical inference) processes are passed to the GPU for execution.

Refer now to FIG. 4B, which is a flowchart 410 depicting the messaging and process allocation between the CPU/GPU. Here, CPU 412 and GPU 414 (typically with many cores, ranging to 10s, 100s, 1000s or more cores) cooperate to solve a problem. The CPU 412 is in control as it reads files 416 and initializes data structures 418. At this point, kernels on the GPU 414 are called and Phase 0 420 is entered.

During Phase 0 420, iteration control is set up 422, and the active data working set is prepared 424. This concludes the phase.

GPU 414 then computes the observation probability 426 during Phase 1. Finally, during Phase 2 428, the active state graph is traversed 430, and the backtrack log is saved 432.

Returning to the CPU 412 side, the backtrack information 434 is collected, and a backtrack 436 is performed. This then allows for an output of the results 438.

Managing aggressive pruning techniques to keep LVCSR computationally tractable requires frequent global synchronizations. Here, on average 0.1-1.0% of the total state space must be tracked, and must communicate the pruning bounds every time step. For noisier inputs, a higher percentage of total state space must be tracked; for less-noisy inputs, a lower percentage is required.

Figure 5:
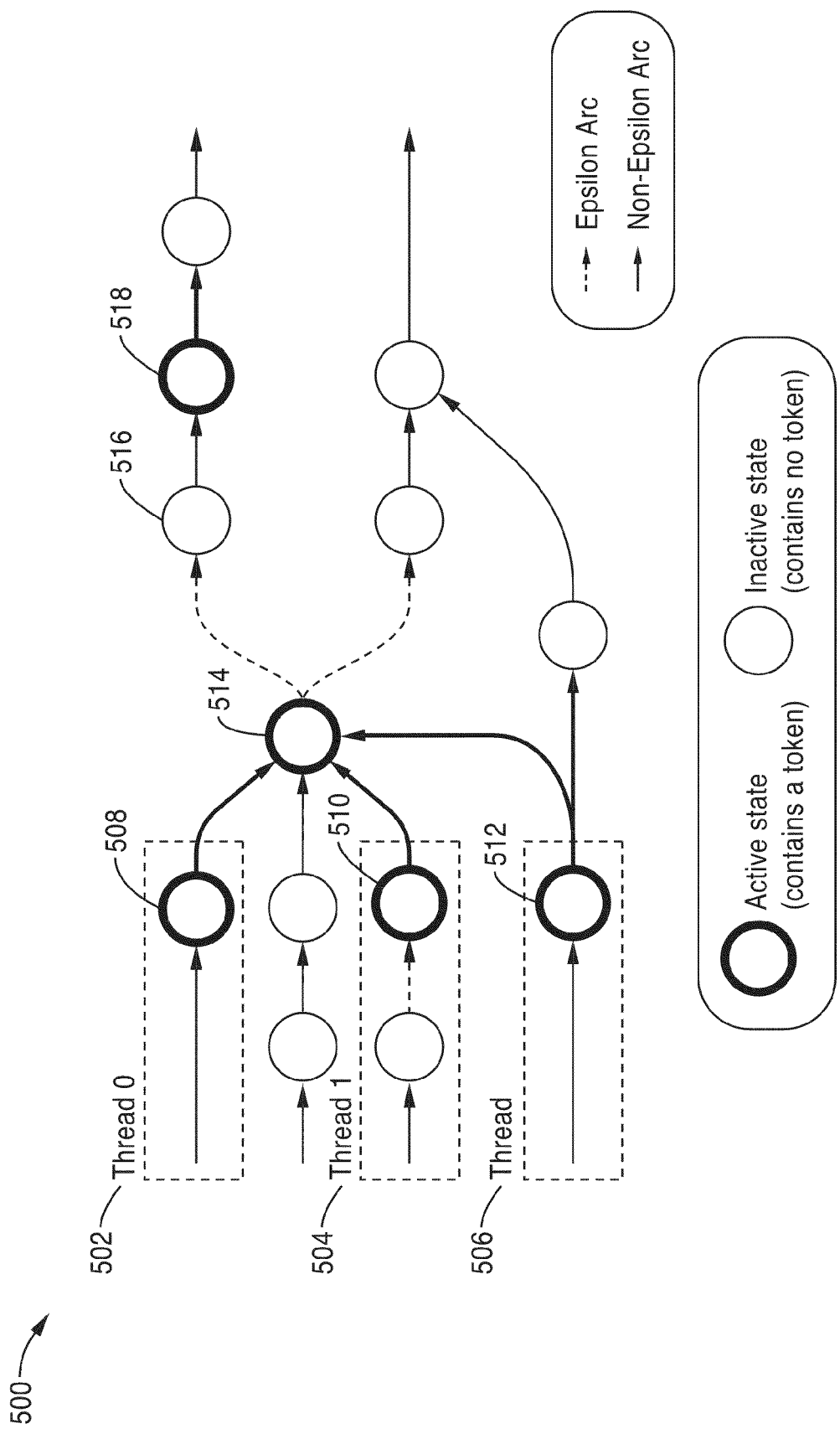
FIG. 5 is a flow chart indicating the WFST network traversal used to implement the Viterbi beam-search algorithm.

Refer now to FIG. 5, which is a flow chart 500 indicating the Weighted Finite State Transducer (WFST) network traversal used to implement the Viterbi beam-search algorithm. Here, Thread 0 502, Thread 1 504, and Thread 2 506 respectively operate on active states 508, 510, and 512. All of these active states point to a next active state 514. From active state 514, the inactive state 516 is traversed to reach the final active state 518. In order to achieve significant speed increases, the collision of inputs to active state 514 must be managed.

There exists significant parallelism opportunities at each time step of the inference engine. For example, one can evaluate thousands of alternative interpretations of a speech utterance concurrently. At the same time, the inference engine involves a parallel graph traversal through a highly irregular knowledge network. The traversal is guided by a sequence of input audio features that continuously change the data working set at run time. The challenge is to not only to define a software architecture that exposes sufficient fine-grained application concurrency (Section 2.1), but also to extract close-to-peak performance on the GPU platform (Section 2.2). Alternatives are also explored in the recognition network structure for more efficient execution on a data parallel implementation platform (Section 2.3).

In contrast with traditional methods, the methods used here optimize the software architecture by implementing data parallel versions of both of the observation probability computation and the graph traversal phases for a GPU platform. The more challenging WFST-based recognition network is used, resulting in greater speedups in each of the two phases.

2. Data Parallel Inference Engine

Among the two phases of the inference engine shown previously in FIG. 2B, the compute-intensive phase involves using Gaussian Mixture Models (GMM) to estimate the likelihood that an input audio feature matches a triphone state. This compute-intensive phase maps well to highly parallel platforms such as GPUs. The communication-intensive phase involves traversing through a highly irregular recognition network, while managing a dynamic working set, which changes at every time step based on input audio features. Although this phase is highly challenging to implement on parallel platforms, by carefully managing application-level trade-offs, significant speedups can still be achieved.

2.1. Overall Optimizations

Implementing both phases on the GPU has significant advantages over separately implementing the compute-intensive phase on the GPU and the communication-intensive phase on the CPU. A split implementation incurs high data-copying overheads between the CPU and the GPU for transferring large amounts of intermediate results. It is also less scalable as the transfers become a sequential bottleneck in the algorithm. Implementing all phases to run on the GPU eliminates data transfers between the CPU and the GPU and thereby allows for more scalable parallel pruning routines.

Both of the phases extensively use the vector units on the GPU, which require coalesced memory accesses and synchronized instruction execution. Memory accesses are coalesced when data is referenced from consecutive memory locations so it can be loaded and used in a vector arithmetic unit directly without rearrangement. The kernels are written to have synchronized instruction control flow so that all lanes in a vector unit are doing useful work while executing the same operation, i.e. the Single-Instruction-Multiple-Data (SIMD) approach.

To maximize coalesced memory accesses, a set of buffers is created to gather the active state and arc information from the recognition network at the beginning of each time step for all later references in that time step. In addition, arc-based traversal is used where each SIMD lane is assigned to compute one out-going arc. Since the amount of computation is the same for all out-going arcs, all SIMD lanes are synchronized during this computation. This approach yields more efficient SIMD utilization and results in a 4× performance gain for the communication-intensive phase when compared to traversing the graph with one state per SIMD lane, where each lane has a different amount of work depending on the number of out-going arcs a state has.

Conflict-free graph traversal is required to implement the Viterbi beam-search algorithm. During graph traversal, active states are simultaneously being processed by parallel threads on different cores. This leads to frequent write-conflicts frequently when threads are trying to update the same destination states at the same time. To still further complicate matters, in statistical inference, it is desired to only keep the most likely result.

To coordinate the graph traversal across cores, atomic operations on the GPU are extensively used. When computing the arc with the most-likely incoming transition to a destination state, each arc transition updates a destination state atomically. This efficiently resolves and manages write-conflicts when multiple cores compute arcs that share the same destination state. Efficiently resolving these write conflicts while keeping just the most likely result for each state is essential for achieving good performance.

2.2. Compute-Intensive Phase Optimization

In the compute-intensive phase, the observation probability of triphone states is computed. This involves two steps: (1) GMM computation and (2) logarithmic mixture reduction. The implementation disclosed here distributes the clusters across GPU cores and uses parallel resources within-core to compute each cluster's mixture model. Both steps scale well on highly parallel processors and the optimization is in eliminating redundant work.

A typical recognition network has millions of arcs, each labeled with one of the approximately 50,000 triphone states. Furthermore, the GMM for the triphone states can be clustered into 2000-3000 clusters. In each time step, on average only 60% of the clusters and 20% of the triphone states are used.

The list of GMM and triphone states to be computed in each time step is pruned based on the lexicon model compiled into the WFST recognition network. Redundant GMM and triphone states are removed from consideration for each time step, thereby reducing the computation time for this phase by 70%.

2.3. Communication-intensive Phase Optimizations

The communication-intensive phase involves a graph traversal process through an irregular recognition network. There are two types of arcs in a WFST-based recognition network: arcs with an input label (non-epsilon arcs), and arcs without input labels (epsilon arcs). In order to compute the set of next states in a given time step, both the non-epsilon and all the levels of epsilon arcs from the current set of active states must be traversed. This multi-level traversal can impair performance significantly. Here, the modification of flattening the recognition network is explored to reduce the number of levels of arcs that need to be traversed, and observe corresponding performance improvements.

During the decoding process, in order to determine the next set of active states all outgoing arcs of the current active states must be traversed. As shown in FIG. 5, there can be multiple arcs producing results for the same destination state. The goal is to keep track of the most likely incoming arc for each destination state and handle the write conflicts when multiple arcs are writing results to the same destination state.

This process usually requires locked and unlock operations to protect a critical atomic section, which involves multiple instructions that perform the following three actions:

1. Comparing the current path likelihood against the existing likelihood at the destination state;
2. Storing the maximum likelihood of a destination state; and
3. Recording the incoming arc that produced the most likely path to a state.

The method used here makes it possible to combine all three actions into one atomic access, thereby greatly reducing the overhead involved in managing highly parallel execution. There are several components to the method:

1. Likelihood representation;
2. Order of integration; and
3. Management of recognition network structure.

First, the most likely path arriving at a destination state must be found. This may be represented as a log-likelihood, which summarizes the likelihood in a representation that uses as few bits as possible.

Second, a fixed-point representation of the log-likelihood information is used, which is packed into the most significant bits (MSBs) of a 32-bit word, which is ordered from least significant bit (LSB) 0 to most significant bit (MSB) 31.

Figure 6A:
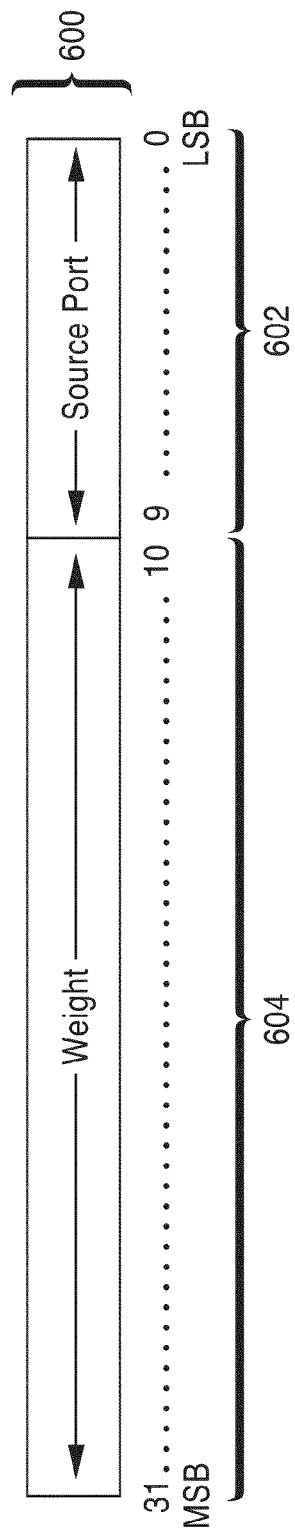
FIG. 6A shows the bit allocations of combining weight and source port into a single 32-bit word to minimize the number of atomic operations.

Refer now to FIG. 6A, which shows the bit allocations of a single 32-bit merged word 600 combining source port 602 and weight 604, which minimizes the number of atomic operations. With the least significant bits (LSBs) of the 32-bit word, the source state is not represented, rather the incoming source port 602. In a large statistical inference problem such as in LVCSR, the number of states could be as large as 4 million large, which would require 22-bits of information to identify (i.e. $2^{22}$=4194304). However, if only the most likely path by the index of an incoming arc is stored, the number of incoming arcs for a particular state could be (by design) at most 1024 large, then a less unique identifier would be needed to identify the most likely path, with consequently fewer bit of storage required. Hence the use of LSBs 0→9, 10 bits of information (i.e. $2^{10}$=1024). Selective duplication, which is further explained below, is used to reduce the number of potential ports to a number ≤1024.

The remaining MSBs 10→31 provide for a binary weight associated with the merged word 600.

Figure 6B:
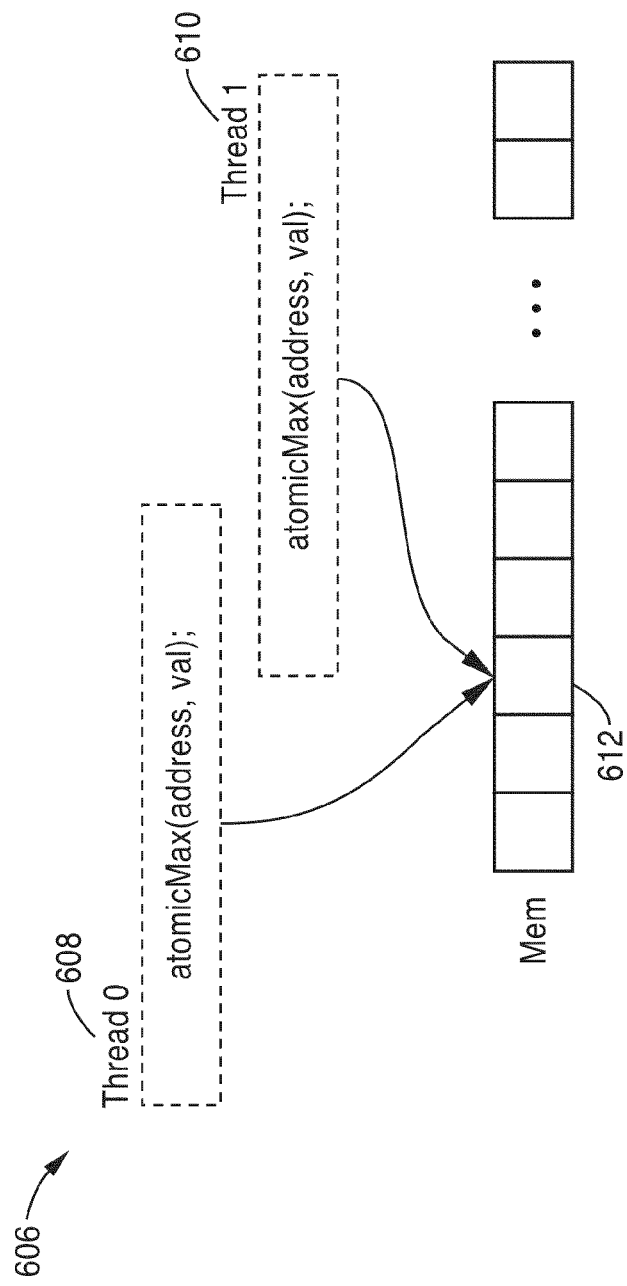
FIG. 6B is a graph of a lock-free access implementation of a shared map that leverages advanced GPU atomic operations (e.g. atomicMax) to enable conflict-free reductions.

Refer now to FIG. 6B, which is a graph 606 of a lock-free access implementation of a shared map that leverages advanced GPU atomic operations to enable conflict-free reductions. Here, both Thread 0 608 and Thread 1 610 are both attempting to write to the same memory location 612 through the atomicMax function. The atomicMax function allows only the larger of the values to be written to the selected memory location 612.

By negating the weight represented in the MSBs, the atomicMax function may also function to find the minimum of the weights. Otherwise, depending on the hardware being used, there may be explicit functions for determining extrema of data words.

While one could potentially use 64-bit atomic word inputs instead of the 32-bit input previously described, the corresponding 64-bit atomic operations would not perform as well as an implementation with 32-bit atomic operations. It should, however, be noted that the selective duplication process would likely not be needed in the 64-bit implementation given the much larger bit-space available.

Third, given a particular state with a very large number of incoming arcs, one can restructure the inference network by selectively duplicating these states.

Figure 7A:
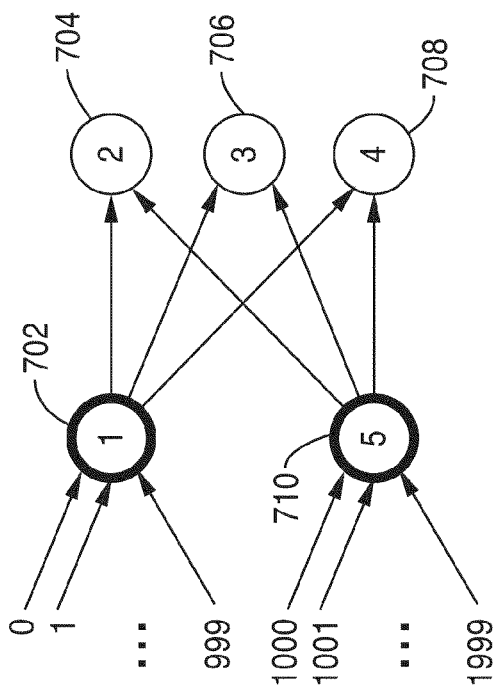
FIG. 7A is a flow chart indicating the state duplication process that enables single-atomic-operation non-epsilon arc traversal.
Figure 7A:
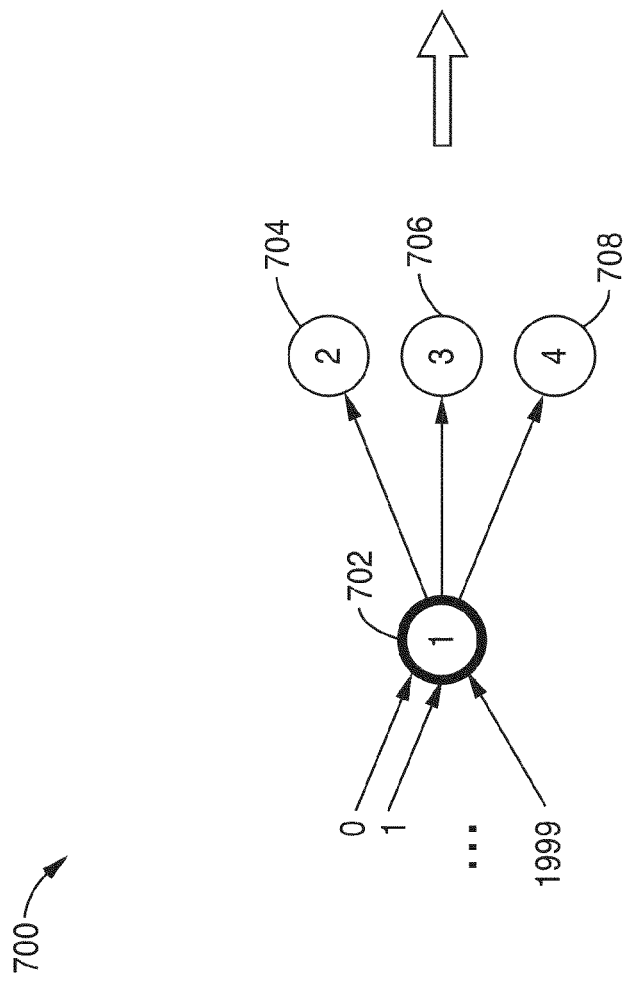

Refer now to FIG. 7A, which is a flow chart indicating the state duplication process 700 that enables single-atomic-operation non-epsilon arc traversal, where state 1 702 has too many (e.g. 1999 is larger than the 1024 number that the 10 bit LSBs can represent) incoming arcs, continuing to state 2 704, state 3 706, and state 4 708. Therefore, the initial state 1 702 was split into state 1 702 and new state 5 710, while preserving the original recognition network semantics. This process is known as selective duplication.

With the three components described above, the arithmetic atomic operations provided by the implementation platform, such as the atomicMax function supported in CUDA, may be used to atomically and conditionally write the merged word 600 (as shown in FIG. 6A) into the destination state if that path is more likely.

In a real-world recognition networks, such as the one used for LVCSR, this selective duplication process contributes 0.05% additional states and 32% additional arcs, but enables up to 87% increase in performance in resolving write-conflicts on a highly parallel implementation.

Figure 7B:
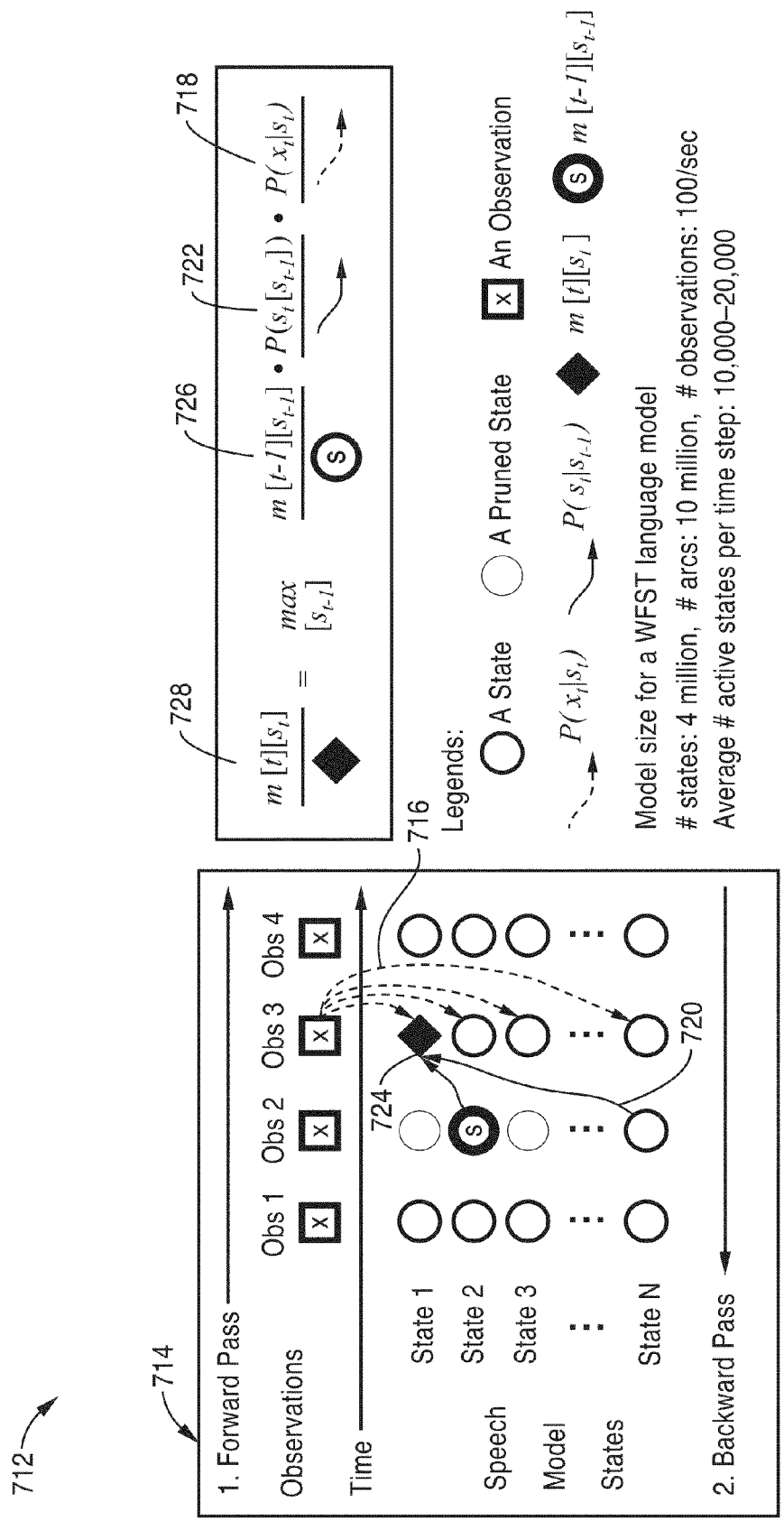
FIG. 7B is a chart indicating the three components of computation involved in evaluating state likelihood, allowing for efficient pruning of excess states.

Refer now to FIG. 7B, which is a chart 712 indicating the three components of computation involved in evaluating state likelihood, allowing for efficient pruning of excess states.

The process of recognizing speech is a type of temporal pattern recognition, which is a well-known application of the Hidden Markov Model (HMM). The states in the HMM for speech recognition are components of words in a vocabulary. They are hidden because they can only be observed through interpreting features in an acoustic waveform. The Viterbi algorithm, with a forward-pass and a backward-pass step, is often used to infer the most likely sequence of words given the observations from the input acoustic waveform.

In the forward-pass, there are two main phases of the algorithm for performing inference 714. Phase 1, (shown in FIG. 7B as dashed arrows between observations and states 716), evaluates the observation probability of the hidden state. It matches the input information to the available acoustic model elements and only takes into account the instantaneous likelihood of a feature matching acoustic model element 718. Phase 2, (shown in FIG. 7B as the solid arrows between states of consecutive time steps 720), references the historic information about what are the most likely alternative interpretations of the utterance heard so far, and computes the likelihood of incorporating the current observation given the pronunciation and language models 722. The computation for each state $s_t$ at time t (with the diamond shaped state 724 as an example) records the state transition from the prior time step t−1 726 that produced the greatest probability m[t][$s_t$] 728.

Input and Outputs

In a standard speech recognition application, the acoustic inputs are features extracted from acoustic waveforms, typically at 10 ms time steps. The number of features used varies among different information sources, languages and acoustic environments in the recognition scenario. For example when recognizing English with single microphone in meeting rooms, 39 features are a common value. Speech models used in this application framework contain information from acoustic models, pronunciation models, and language models. They are combined statically using weighted finite state transducer (WFST) techniques into a monolithic graph structure. Depending on the language models, the speech model graphs often contain millions of states and tens of millions of arcs.

Working Set Size

When using the speech model during inference, it is observed that one can achieve good accuracy by tracking a small percentage of the total number of states representing the most likely alternative interpretations of the utterances. During many experiments, it was found that tracking more than 1% of the most likely alternative interpretations provides diminishingly small improvements in accuracy while requiring a linear increase in execution time. Thus the working set of active states is kept below 1% of the total number of states in the speech model, which is on average 10,000 to 20,000 active states.

Concurrency

There are four main levels of concurrency in the inference process.

The application description and the amount of concurrency available at each level are highlighted below. The opportunities and challenges posed by these levels of concurrency in an implementation will be explored in detail in Section 2.4.

1. Different speech utterances can be distributed to different machines for processing. A typical conversational utterance can be 5-30 seconds long, and a one-hour audio input can be distributed to hundreds of machines to process. Each inference process can take billions of instructions and last a few seconds.

2. For a set of utterances, if the forward and backward passes in the Viterbi algorithm are handled by dedicated computing resources such as different cores or different processors, the two passes can be pipelined. When utterance A has completed the forward-pass and proceed to compute the backward pass, utterance B can initiate its forward-pass.

3. In the forward-pass, if Phase 1 and Phase 2 are handled by dedicated computing resources, the two phases can be pipelined: i.e. one time step can be in Phase 2 while another time step performs Phase 1 on another computing resource.

4. Within each of the functions in Phase 1 and Phase 2 of the forward pass, there are thousands of observation probabilities and tens of thousands of alternative interpretation of the utterance to track. Each can be tracked independently with some amount of synchronization required after each function. Each unit of work is usually no larger than tens to hundreds of instructions.

Performance Constraints

The goal of automatic speech recognition is to transcribe a sequence of utterances as fast as possible with as high accuracy as possible. For commercial applications, there is usually an accuracy threshold which makes the usage scenario realistic and practical. For example, for in-car command and control applications, one may tolerate a 5% command error rate in the interpretation of non-essential commands. For data analytics, where one searches for the keywords in a recorded telephone conversation, a 50% word error rate may be tolerable and still yield useful results.

2.4 Software Architecture

Software architecture is the organization of a software program expressed as hierarchical composition of patterns. In the application framework, the software architecture expresses the composition of the reference implementation and reflects decisions made when mapping application concurrency to parallel hardware resources.

The hardware resources targeted in this ASR application framework is the GPU, which is an offload device with the CPU acting as the host engine. Programs running on the GPU are written in CUDA, a language based on C++, with minor keyword extensions. CUDA programs are invoked from the host CPU code, and operands must be explicitly transferred between the CPU and the GPU. Recent GPUs such as the GTX480 contain 15 cores each with dual issue 16-wide SIMD units, with non-coherent caches and scratch space memories available in each core. In order to efficiently program the GPU, one must efficiently leverage the wider vector units, the GPU memory hierarchy, and the synchronization primitives within and between cores.

Concurrency Exploited

In this ASR application framework for highly parallel implementations on manycore processors, the fourth type of concurrency was selected: the fine grained parallelism within each of the functions in Phase 1 and Phase 2 of the forward pass of the inference algorithm. This choice may be the most complex to implement but provides the most efficient utilization of the manycore platform.

When mapping the application onto a manycore platform, the following thought experiments were performed to help eliminate choosing any of the first three types of concurrency:

1. Concurrency among speech utterances is most readily accessible. It can be exploited over multiple processors and is complementary to the more challenging fine-grained concurrency explored among cores on a chip and among vector lanes within a SIMD unit. Exploiting concurrency among speech utterances among cores and vector lanes, however, is not practical. With tens of cores sharing the same memory subsystem, the available memory capacity and memory bandwidth in a GPU cannot accommodate the working set sizes of tens of concurrent speech inference processes.

2. When different forward and backward passes are mapped onto different resources, referring to the pipe-and-filter computational parallel programming pattern, load balancing becomes the most significant factor in achieving efficient utilization. Backward pass performs less than 1% of the work done by the forward pass, thus the source of concurrency is not suitable for exploitation.

3. Depending on the model parameters used, Phase 1 and Phase 2 of the forward pass do similar amounts of work. However, referring to the pipe-and-filter computational parallel programming pattern, communication between the "filters" along the "pipes" may limit performance. In this case, if Phase 1 and Phase 2 are implemented on both a GPU and a CPU, the amount of intermediate results that must be transferred between them can become a performance bottleneck.

Architecture Representation

The software architecture for the Automatic Speech Recognition (ASR) application framework is a hierarchical composition of parallel programming patterns, as shown in FIGS. 2A and 2B. The top level of the inference engine can be associated with the Bulk Synchronous Structural Pattern, where each iteration is handling one input feature vector corresponding to one time step.

The computation for the entire iteration is mapped onto the GPU device, such that the computation throughput will not be bottlenecked by intermediate results transferring between the CPU and the GPU. The work within each iteration can be associated with the Task Graph Structural Pattern, where different functions in two phases of execution take place. Each function in each of the two phases can be associated with the MapReduce Structural Pattern, where thousands of observation probabilities are computed in parallel, and tens of thousands of alternative interpretations of a speech utterance are tracked in parallel.

3. Results 3.1. Experimental Platform and Baseline Setup

In one embodiment, the NVIDIA GTX280 GPU is used with an Intel Core2 Q9550 based host platform. GTX280 has 30 cores with 8-way vector arithmetic units running at 1.296 GHz. The processor architecture allows a theoretical maximum of 3 floating point operations (FLOPs) per cycle, resulting in a maximum of 933 GFLOPs peak performance per second. The sequential results were measured on an Intel Core i7 920 based platform with 6 GB of DDR memory. The Core i7-based system is 30% faster than the Core2-based system because of its improved memory sub-system, providing a more conservative speedup comparison. The sequential implementation was compiled with the Intel C++ Compiler Version 10.1.015 using all automatic vectorization options. Kernels in the compute-intensive phase were hand optimized with Intel Streaming Single-Instruction-Multiple-Data (SIMD) Extensions (SSE) intrinsics.

Figure 8:
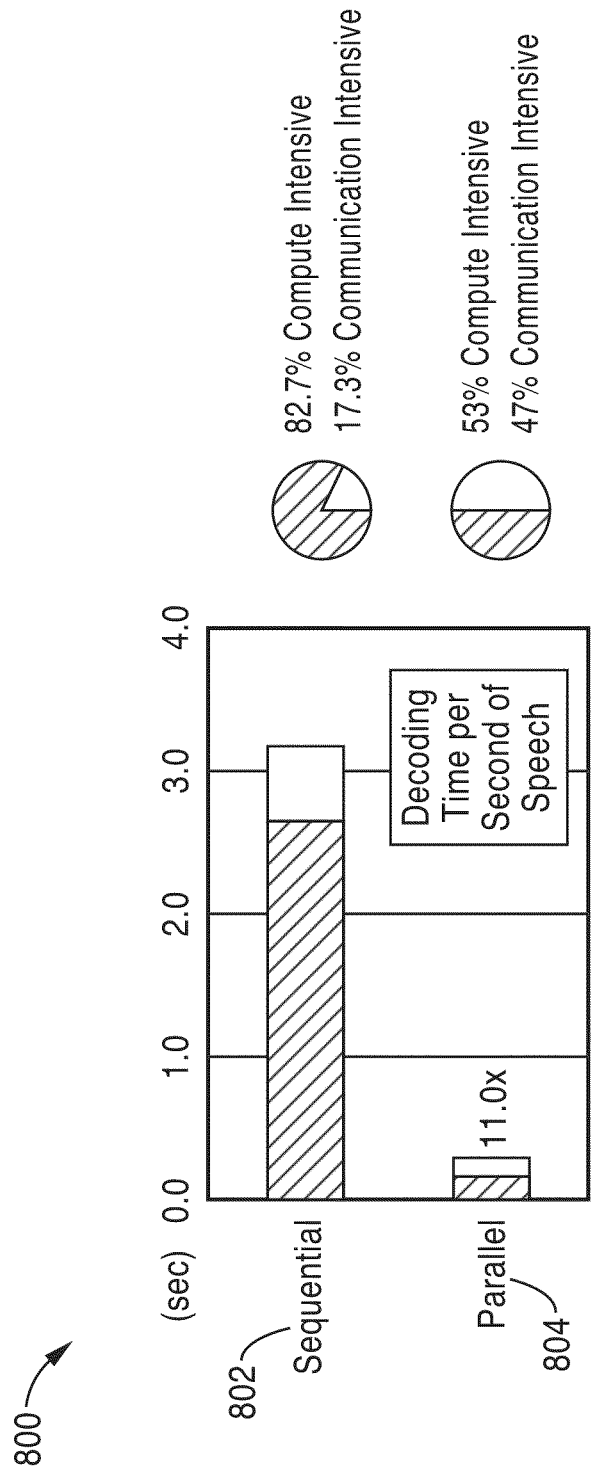
FIG. 8 is a graph indicating the speedup enabled by the implementation of the methods described herein.

Refer now to FIG. 8, which details the results 800 of the implementation. As shown in FIG. 8, the sequential performance 802 achieved was 3.23 seconds per one second of speech, with Phase 1 (Compute Intensive) and 2 (Communication Intensive) taking 2.70 and 0.53 seconds respectively. The parallel implementation 804 was compiled with Intel C++ Compiler Version 10.1.015 and NVIDIA C++ Compiler version 2.2 using Compute Capability v1.3.

Speech Models and Test Sets

The speech models were taken from the SRI CALO real time meeting recognition system. The frontend uses 13d PLP (13-dimensional features using Perceptual Linear Prediction feature extraction technique) features with 1st, 2nd, and 3rd order differences, Vocal Track Length (VTL) normalized and projected to 39d using Heteroscedastic Linear Discriminant Analysis (HLDA). The acoustic model was trained on conversational telephone and meeting speech corpora, using the discriminative Minimum Phone Error (MPE) criterion. (MPE provides a metric for evaluating the accuracy of phone models.)

The Language Model (LM) was trained on meeting transcripts, conversational telephone speech and web and broadcast data. The acoustic model includes 52K triphone states which are clustered into 2,613 mixtures of 128 Gaussian components. The recognition network is an H∘C∘L∘G model compiled using WFST techniques.

The test set consisted of excerpts from NIST conference meetings taken from the "individual head-mounted microphone" condition of the 2007 NIST Rich Transcription evaluation. The segmented audio files total 3.1 hours in length and comprise 35 speakers. The meeting recognition task is very challenging due to the spontaneous nature of the speech (note that a single-pass time-synchronous Viterbi decoder from SRI using lexical tree search achieves 37.9% WER on this test set). The ambiguities in the sentences require larger number of active states to keep track of alternative interpretations which leads to slower recognition speed.

The recognizer used here follows an adaptive heuristic to control the number of active states by adjusting the pruning threshold at run time. This allows all traversal data to fit within a pre-allocated memory space.

Table 1 demonstrates the trade-offs of recognition network augmentation for efficient data parallel traversal in the statistical inference engine herein. The augmentation for the Two-Level setup resulted in a 2.0% increase in arc count, whereas the augmentation for One-Level setup resulted a 32.2% increase. The dynamic number of arcs evaluated increased marginally for the Two-Level setup. However for the One-Level solution it increased significantly by 48-62%, as states with more arcs were visited more frequently.

Table 2 shows the decoding accuracy, i.e., Word Error Rate (WER) with varying thresholds and the corresponding decoding speed on various platforms. The recognition speed is represented by the real-time factor (RTF) which is computed as the total decoding time divided by input speech duration.

As shown in Table 2, the GPU implementation can achieve order of magnitude more speedup over the sequential implementation for the same number of active states. More importantly, one may trade-off speedup with accuracy. For example, one can achieve 54.0% WER traversing an average of 3390 states per time step with a sequential implementation, or one can achieve a 50.9% WER traversing an average of 19306 states per time step while still getting a 4.1× speedup, improving from an Real-Time Factor (RTF) of 1.20 to 0.29.

3.3. Compute-Intensive Phase

The parallel implementation of the compute-intensive phase achieves close to peak performance on GTX280. As shown in Table 3, it was found that the GMM computation memory-bandwidth limited and the implementation described here achieves 85% of peak memory bandwidth. The logarithmic mixture reduction is compute limited and this implementation achieves 98% of achievable peak compute performance given the instruction mix.

3.4. Communication-Intensive Phase

Parallelizing this phase on a quad core CPU achieves a 2.85× performance gain and incurs intermediate result transfer overhead. A 3.84× performance gain was achieved with an equivalent configuration on the GPU and avoided intermediate result transfer overhead. Despite the better speedup on the GPU, this phase became more dominant as shown in FIG. 8.

Figure 9:
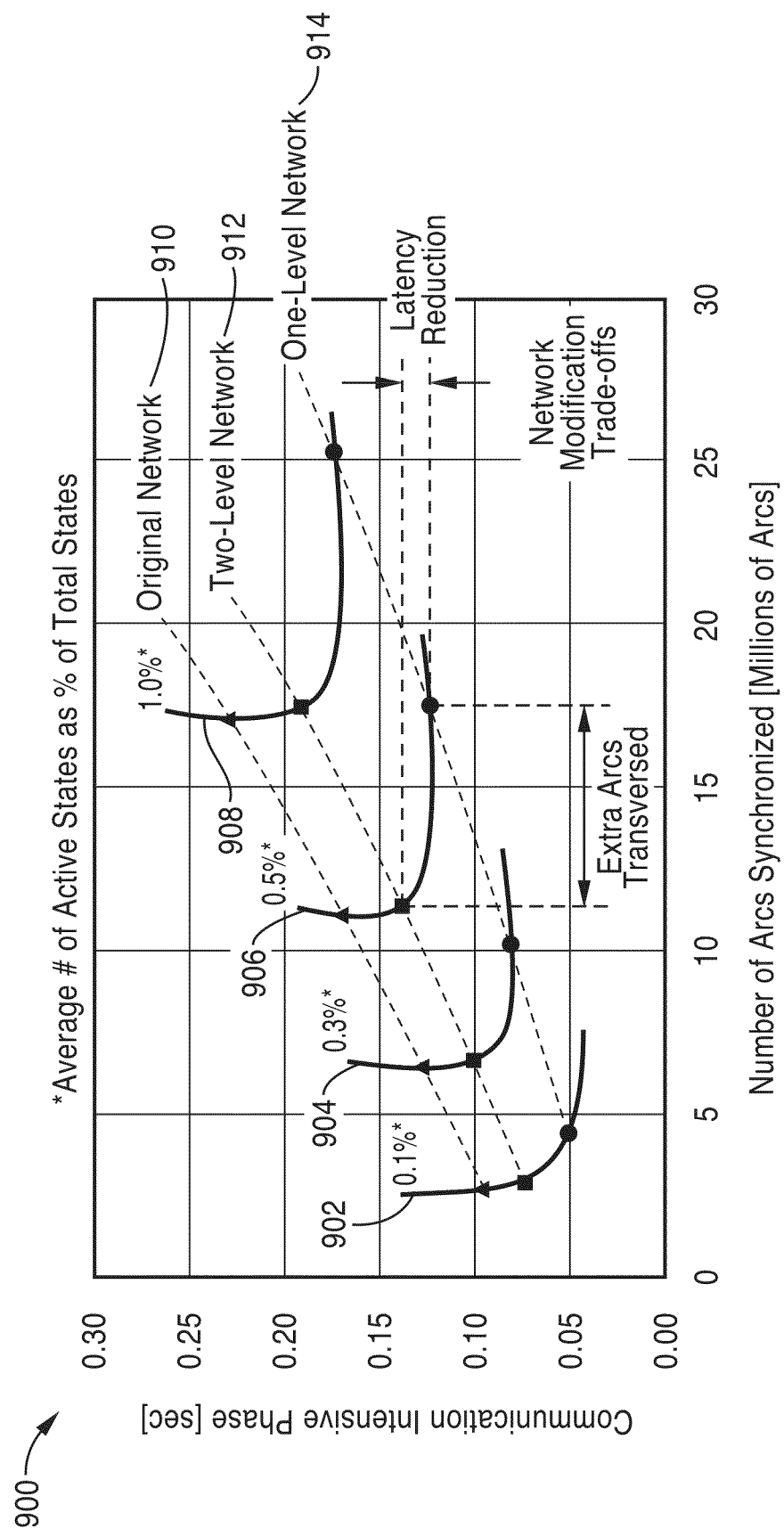
FIG. 9 is a graph of Communication-Intensive Phase Run Time versus the Number of Arcs Synchronized in the Statistical Inference Engine (normalized to one second of speech).

Refer now to FIG. 9, which is a graph of Communication-Intensive Phase Run Time versus the Number of Arcs Synchronized in the Statistical Inference Engine 900 (normalized to one second of speech). Here, the run times for various pruning thresholds are shown. Pruning thresholds of 0.1% 902, 0.3% 904, 0.5% 906, and 1.0% 908 are shown. The network modifications are described in Section 2.3.

It should be noted that in curve 902, the selective duplication process contributes 0.05% additional states and 32% additional arcs, but enables up to 87% increase in performance in resolving write-conflicts in a highly parallel implementation.

The three dashed lines from the lower left of the graph to the upper right indicate the performance of three families of network modifications: the Original Network 910, the Two-level Network 912, and the One-level Network 914. Without network modifications, there is a significant performance penalty as multiple levels of epsilon arcs must be traversed with expensive global synchronization steps between levels. With minimal modifications to the network a 17-24% speedup for this phase is seen. An additional 8-29% speedup can be achieved by eliminating epsilon arcs completely, saving the fixed cost of one level of global synchronization routines, but this comes at the cost of traversing 48-62% more arcs.

4. Conclusion

A fully data parallel speech inference engine has been presented with both observation probability computation and graph traversal implemented on an NVIDIA GTX280 GPU. The results presented here show that modifications to the recognition network are essential for effective implementation of data parallel WFST-based LVCSR algorithm on a GPU. The implementation used here achieved up to 11.7× speedup compared to highly optimized sequential implementation, with a 5-8% sequential overhead without sacrificing accuracy. This software architecture enables performance improvement potentials on future platforms with more parallelism. An exemplary computer program according to an embodiment of the invention is presented in the computer program listing of Appendix A.

From the discussion above it will be appreciated that the invention can be embodied in various ways, including but not limited to the following:

1. A method of statistical inference, comprising: (a) providing a computing platform comprising a Central Processing Unit (CPU) and a Graphical Processing Unit (GPU); (b) generating a one or more level arc-based recognition network for a problem, comprising: a plurality of epsilon arcs; a plurality of non-epsilon arcs; a plurality of states that may be interconnected by one or more epsilon or non-epsilon arcs; and (c) selectively flattening the levels of the recognition network so as to improve inference speed; (d) wherein the recognition network is executed on the CPU and the GPU.

2. The method of embodiment 1, wherein the selectively flattening step results in a flatter recognition network selected from a group of flatter networks consisting of: a two-level network and a one-level network.

3. The method of embodiment 1, wherein the selectively flattening step comprises: addition of one or more epsilon arcs; or replacing one or more epsilon arcs with non-epsilon arcs; wherein the recognition network semantics are preserved.

4. The method of embodiment 3, further comprising: generating an incoming array for a target state in the recognition network; wherein the incoming array comprises: a set of incoming states pointing to the target state; and a corresponding weight that each incoming state will traverse to the target state.

5. The method of embodiment 4, further comprising: selectively pruning the incoming array to remove states with the corresponding probability below a threshold, thereby resulting in a reduced incoming state array.

6. The method of embodiment 5, further comprising: mapping the reduced incoming state array to a port array.

7. The method of embodiment 6, further comprising: selectively duplicating parts of the recognition network so as to reduce the size of the port array to a size represented by a Least Significant Bits (LSBs) portion of a merged word associated with each of the reduced incoming state array elements.

8. The method of embodiment 7, further comprising: assigning a weight to a Most Significant Bits (MSBs) portion of the merged word associated with each of the reduced incoming array state elements; wherein the weight represents the corresponding probability that the reduced incoming array state element will traverse to the target state.

9. The method of embodiment 8, further comprising: traversing the recognition network in one- or two-levels of parallel traversal; wherein the traversal from the reduced incoming state array to the target state is conflict-free.

10. The method of embodiment 9, wherein the conflict-free traversal uses an extremum of the merged word weight associated with the reduced incoming array state elements.

11. The method of embodiment 10, wherein the extremum is selected from a group of extrema consisting of: a maximum and a minimum.

12. The method of embodiment 10, wherein the conflict-free traversal extremum is performed on the GPU.

13. The method of embodiment 12, wherein the traversal extremum step is performed using one- or two-levels of atomic extremum functions on the GPU.

14. The method of embodiment 4, wherein the generating the incoming array corresponding weight is performed on the GPU.

15. The method of embodiment 4, wherein the problem is selected from a group of problems consisting of: Large Vocabulary Continuous Speech Recognition (LVCSR); Optical Character Recognition (OCR); and automatic language translation.

16. The method of embodiment 1, wherein the method is implemented by a CPU and GPU executable stored on a computer readable medium.

17. The method of embodiment 1, wherein the CPU and GPU communicate either directly, or by means of a shared memory, or by both directly and by means of a shared memory.

18. The method of embodiment 1, wherein the CPU and GPU have either a same or different hardware architecture.

19. A method for parallel statistical inference on a highly parallel platform, comprising: combining optimizations in a recognition model (a recognition network) with optimizations in a recognition procedure (an inference engine).

20. A statistical inference system, comprising: a programmable CPU controlling a GPU; wherein a programming executable on the CPU causes the GPU to carry out operations comprising: selectively flattening levels of a recognition network to improve inference speed; and selectively duplicating parts of the recognition network to minimize a critical section in atomic accesses to as few as one atomic instruction.

21. A statistical inference method, comprising: selectively flattening levels of a recognition network to improve inference speed; and selectively duplicating parts of the recognition network to minimize a number of atomic operations; providing a programmable CPU controlling a programmable GPU; wherein a programming executable on the CPU causes the programmable GPU to carry out operations comprising: the selectively flattening step; or the selectively duplicating step; or the selectively flattening step and the selectively duplicating step.

22. The statistical inference method of embodiment 21, further comprising: executing the recognition network by using a merged word to minimize atomic operations in the GPU.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

In addition, embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation (s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation (s), algorithm(s), and/or block(s) of the flowchart(s).

(b) generating a one or more level arc-based recognition network for a problem, comprising:
    a plurality of epsilon arcs;
    a plurality of non-epsilon arcs;
    a plurality of states that may be interconnected by one or more epsilon or non-epsilon arcs; and
(c) selectively flattening the levels of the recognition network so as to improve inference speed;
(d) wherein the recognition network is executed on the CPU and the GPU;

TABLE 1

Performance with Different Recognition Network Augmentation (Run times Normalized to one Second of Speech)

| | Original WFST Network | | | | Two-Level WFST Network | | | | One-Level WFST Network | | | |
|---|---|---|---|---|---|---|---|---|---|---|---|---|
| | | | | | Active States (% of state space) | | | | | | | |
| | 0.1% | 0.3% | 0.5% | 1.0% | 0.1% | 0.3% | 0.5% | 1.0% | 0.1% | 0.3% | 0.5% | 1.0% |
| Total States | | 4,114,507 | | | | 4,114,672 (+0.003%) | | | | 4,116,732 (+0.05%) | | |
| Total Arcs | | 9,585,250 | | | | 9,778,790 (+2.0%) | | | | 12,670,194 (+32.2%) | | |
| Arcs Traversed* | 27,119 | 64,489 | 112,173 | 171,068 | 27,342 | 65,218 | 114,043 | 173,910 | 44,033 | 103,215 | 174,845 | 253,339 |
| Arcs increase (%) | — | — | — | — | +0.8% | +1.1% | +1.7% | +1.7% | +62% | +60% | +56% | +48% |
| Phase 1 (ms. %) | 77.41% | 112.43% | 146.43% | 177.41% | 77.48% | 112.50% | 146.48% | 178.45% | 73.55% | 110.55% | 147.51% | 177.48% |
| Phase 2 (ms. %) | 97.52% | 127.49% | 171.50% | 230.53% | 74.46% | 99.44% | 138.45% | 191.48% | 52.39% | 81.40% | 125.43% | 175.47% |
| Seq Ovrhd (ms. %) | 13.7% | 20.8% | 24.7% | 28.6% | 11.7% | 14.6% | 20.7% | 25.6% | 8.6% | 10.5% | 16.5% | 21.6% |
| Total (ms) | 187 | 258 | 341 | 436 | 161 | 225 | 304 | 393 | 134 | 202 | 289 | 373 |
| Faster than real time | 5.3X | 3.9X | 2.9X | 2.3X | 6.2X | 4.4X | 3.3X | 2.5X | 7.5X | 5.0X | 3.5X | 2.7X |

*Average number of arcs traversed per time step

TABLE 2

Accuracy, word error rate (WER), for various beam size and decoding speed in real-time factor (RTF)

| | | Avg. # of Active State | | | |
|---|---|---|---|---|---|
| | | 32398 | 19306 | 9763 | 3390 |
| | WER | 51.1 | 50.9 | 51.4 | 54.0 |
| RTF | Sequential CPU | 4.36 | 3.17 | 2.29 | 1.20 |
| | Parallel GPU | 0.37 | 0.29 | 0.20 | 0.14 |
| | Speedup | 11.7 | 11.0 | 11.3 | 9.0 |

TABLE 3

Efficiency of the Computation Intensive Phase

| (GFLOP/s) | Step 1 | Step 2 |
|---|---|---|
| Theoretical Peak | 933 | 933 |
| | Mem BW Limited | Inst Mix Limited |
| Practical Peak | 227 | 373 |
| Measured | 194 | 367 |
| Utilization | 85% | 98% |

What is claimed is:

1. A method of statistical inference, the method comprising:
    (a) providing a computing platform comprising a Central Processing Unit (CPU) and a Graphical Processing Unit (GPU);

(e) wherein the selectively flattening step comprises replacing one or more epsilon arcs with non-epsilon arcs, wherein semantics of the recognition network are preserved;
(f) generating an incoming array for a target state in the recognition network, said incoming array comprising:
    a set of incoming states pointing to the target state; and
    a corresponding weight that each incoming state will traverse to the target state;
(g) selectively pruning the incoming array to remove states with a corresponding probability below a threshold, thereby resulting in a reduced incoming state array; and
(h) mapping the reduced incoming state array to a port array.

2. The method of claim 1, wherein the selectively flattening step results in a flatter recognition network selected from a group of flatter networks consisting of: a two-level network and a one-level network.

3. The method of claim 1, further comprising:
selectively duplicating parts of the recognition network so as to reduce the size of the port array to a size represented by a Least Significant Bits (LSBs) portion of a merged word associated with each of the reduced incoming state array elements.

4. The method of claim 3, further comprising:
assigning a weight to a Most Significant Bits (MSBs) portion of the merged word associated with each of the reduced incoming array state elements;
wherein the weight represents the corresponding probability that the reduced incoming array state element will traverse to the target state.

5. The method of claim 4, further comprising:
traversing the recognition network in one- or two-levels of parallel traversal;
wherein the traversal from the reduced incoming state array to the target state is conflict-free.

6. The method of claim 5, wherein the conflict-free traversal uses an extremum of the merged word weight associated with the reduced incoming array state elements.

7. The method of claim 6, wherein the extremum is selected from a group of extrema consisting of: a maximum and a minimum.

8. The method of claim 6, wherein the conflict-free traversal extremum is performed on the GPU.

9. The method of claim 8, wherein the traversal extremum step is performed using one- or two-levels of atomic extremum functions on the GPU.

10. The method of claim 1, wherein the generating the incoming array corresponding weight is performed on the GPU.

11. The method of claim 1, wherein the problem is selected from a group of problems consisting of:
Large Vocabulary Continuous Speech Recognition (LVCSR);
Optical Character Recognition (OCR); and
automatic language translation.

12. The method of claim 1, wherein the method is implemented in the form of a CPU and GPU executable stored on a computer readable medium which when executed carries out the steps of the method.

13. The method of claim 1, wherein the CPU and GPU communicate either directly, or by means of a shared memory, or by both directly and by means of a shared memory.

14. The method of claim 1, wherein the CPU and GPU have either a same or different hardware architecture.

15. A statistical inference system, comprising:
a programmable CPU controlling a GPU; and
programming executable on the CPU that causes the GPU to carry out operations comprising:
selectively flattening levels of a recognition network to improve inference speed; and
selectively duplicating parts of the recognition network to minimize a critical section in atomic accesses to as few as one atomic instruction.

16. A statistical inference method, comprising:
selectively flattening levels of a recognition network to improve inference speed; and
selectively duplicating parts of the recognition network to minimize a number of atomic operations;
providing a programmable CPU controlling a programmable GPU;
wherein programming executable on the CPU causes the programmable GPU to carry out operations comprising:
the selectively flattening step; or
the selectively duplicating step; or
the selectively flattening step and the selectively duplicating step.

17. The statistical inference method of claim 16, further comprising:
executing the recognition network by using a merged word to minimize atomic operations in the GPU.

* * * * *